United States Patent

Zimmer et al.

[11] 3,994,683
[45] Nov. 30, 1976

[54] METHOD OF AND AN ARRANGEMENT FOR PRINTING FIBER BASED MATERIALS

[75] Inventors: Peter Zimmer, Kufstein, Austria; Johannes Eibl, Burscheid-Kaltenherberg; Karlheinz Wolf, Leverkusen, both of Germany

[73] Assignees: Peter Zimmer, Kufstein, Austria; Bayer Aktiengesellschaft, Leverkusen, Germany

[22] Filed: Nov. 15, 1974

[21] Appl. No.: 524,219

[30] Foreign Application Priority Data
Nov. 16, 1973  Austria .............................. 9674/73
Feb. 12, 1974  Germany............................ 2406666

[52] U.S. Cl. ...................................... 8/176; 8/1 R; 8/178 R; 8/179; 8/62; 68/5 B; 427/197
[51] Int. Cl.² ..................... D06P 3/00; D06P 5/00
[58] Field of Search ....................... 8/176, 62, 1 R; 427/197

[56] References Cited
UNITED STATES PATENTS

| | | | |
|---|---|---|---|
| 1,519,143 | 12/1924 | Lamb | 8/1 |
| 1,527,446 | 2/1925 | Schiesari | 8/1 R |
| 1,602,446 | 10/1926 | Olson | 8/1 |
| 1,694,466 | 12/1928 | Clavel | 8/14 |
| 1,796,039 | 3/1931 | Mijer | 68/5 |
| 2,221,776 | 11/1940 | Carlson | 252/62.1 P |
| 3,202,092 | 8/1965 | Childress | 101/114 |
| 3,619,103 | 11/1971 | Williams et al. | 8/14 |
| 3,632,291 | 1/1972 | Defago et al. | 8/2.5 |
| 3,682,738 | 8/1972 | Smith | 156/283 |
| 3,707,346 | 12/1972 | Markert et al. | 8/2.5 |

*Primary Examiner*—Joseph L. Schofer
*Assistant Examiner*—A. L. Clingman
*Attorney, Agent, or Firm*—Plumley and Tyner

[57] ABSTRACT

The invention relates to the printing of sheet-heavy-pile textile materials, especially carpets, characterized in that powdered dyestuff preparations are applied to the sheet of textile material in consistency with the pattern, preferably by the screen- printing or film-printing techniques, the dye is subsequently fixed by the action of heat and any constituents of the dye preparations which are not fixed are removed by suction or by washing. The new method is economical and causes no or little pollution.

9 Claims, 10 Drawing Figures

METHOD OF AND AN ARRANGEMENT FOR PRINTING FIBER BASED MATERIALS

This invention relates to a method of printing sheet-form textile materials, more especially heavy-pile materials, which is distinguished by the fact that dye preparations in either powdered or granular form are applied to the sheet of textile material in consistency with the pattern, preferably by the screen- printing or film-printing techniques, the dye is subsequently fixed by the action of heat and any constituents of the dye preparations which are not fixed are removed by suction or by washing.

In the context of the invention, "heavy-pile materials" are velours, fleeces, felts, skins and, above all, carpets. Particularly suitable heavy-pile materials are carpeting materials of synthetic hydrophobic fibres such as, for example, fibres or polyamides, polyacrylonitrile, polyurethanes, polyolefins, cellulose triacetate and, preferably, aromatic polyesters. However, materials made of natural fibres, such as wool, cotton, hemp, jute, hair and the like, can also be printed by the method according to the invention.

The powder-form dye preparations must be free-flowing and non-hydroscopic, and may consist of pure dyes (providing they have the requisite physical properties) or, preferably of dye/filler blends.

Suitable fillers include any of the usual inert organic and inorganic low-friction substances such as talcum, Glauber's salt, barium sulphate, calcium carbonate, soda, zinc oxide, titanium dioxide and high molecular weight silicas (for example Aerosils), as well as resins (for example colophony, urea, sugar, dextrin and conventional anionic dispersants (for example ligin sulphonates, condensation products of naphthalene, formaldehyde and sulphuric acid), etc. Talcum, talcum/Aerosil mixtures and also finely ground calcium carbonate are preferably used.

The ratio in which dye and filler are mixed is governed by the type of fibre-based material to be printed by the colouring strength of the dye, by the required depth of colour, etc, and is generally in the range of from 10 to 50:90 to 50, preferably amounting to 20:80.

The powder-form dye preparation can be produced by known processes, for example the dyes can be mixed, preferably dry, with the fillers and optionally ground, although the components can also be mixed in moist form or in the form of finely dispersed aqueous dispersions or solutions and the resulting mixtures dried and optionally ground. Alternatively, one component of the mixture can be prepared in the presence of the other and both components subsequently isolated. If one of the components, especially the fillers, has a softening point below 200° C, the other component can be dissolved in it or kneaded with it at an elevated temperature optionally in the presence of plasticisers and/or surfactants, and the resulting mass processed by spraying, granulation or, after cooling, by grinding to the required size.

The choice of the dye used is governed by the type of material to be printed. Synthetic polyamides are dyed, for example, with conventional metal complex dyes of the azo series, although they can also be dyed with conventional acid dyes of the azo and anthraquinone series. Dispersion dyes, such as azo dyes, anthraquinone dyes, styryl, nitro perinone and quinophthalone dyes, are particularly suitable for dyeing polyesters and polyolefins, and also for dyeing synthetic polyamides.

Sublimable dispersion dyes of the kind used for transfer printing are preferably used.

Polyacrylonitrile dyes are dyed with conventional basic dyes containing an ammonium group. Sublimable free dye passes of the triphenyl methane and azomethine series are particularly suitable.

Cotton and wool can be dyed with reactive dyes, although they can also be dyed with substantive dyes and with naphthol-AS-dyes. The rest of the fibres referred to above can also be dyed with the conventional dyes developed for them. The grain size of the dye preparations is governed by the mesh width of the screens and is generally in the range of from 1 to 40 $\mu$.

The dye preparations can be applied either continuously or at intervals by knife coating, brush coating or, preferably, by spray coating.

In cases where the dye preparations are applied at intervals, a screen is placed on the article to be printed arranged on a fixed table and the dye preparation is applied either by hand or mechanically.

Penetration of the dye powder into the heavy-pile sheet-form textile material can be promoted by vibrating the textile material from underneath, for example by means of a contact eccentric.

This printing operation can be repeated several times.

The quantity of dye powder to be applied is governed by various factors and, in particular, by size and wall thickness of the screen, and in general amounts to 100–150 mg of dye preparation per g of fibre. The printed textile is then delivered to a horizontal fixing unit in which the dyes are fixed over a period of from 1 to 2 minutes by superheated steam (175°–185° C), heat rays (infrared rays) or by a throttled hot-air stream (170°–220° C).

The textile does not have to be horizontally guided for the entire fixing period. It is sufficient, for example, for the textile to be briefly prefixed (15 to 30 seconds) in a horizontal position by exposing it to infrared radiation, after which the textile can be delivered to a fixing unit of any kind, for example a hot-air fixing unit.

However, the method according to the invention is preferably carried out using special arrangements which are also the subject of the invention and which are described in more detail in the following with reference to the accompanying drawings, wherein.

Figure 1:
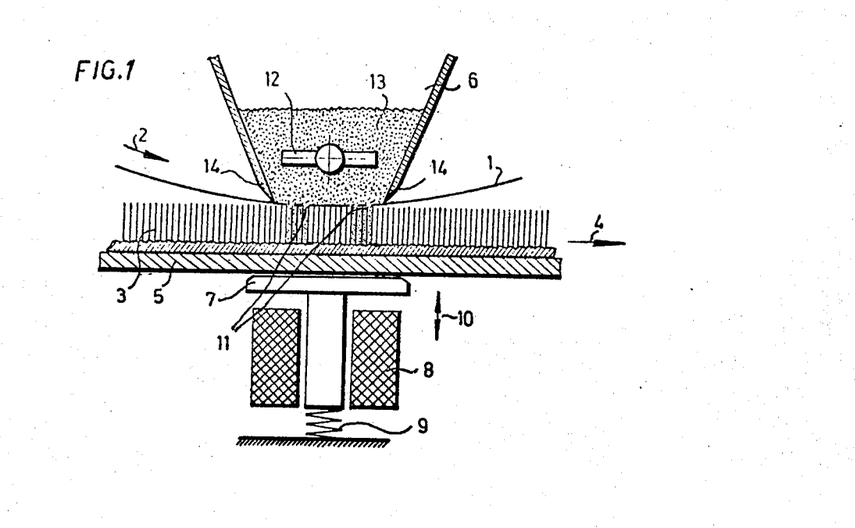
FIG. 1 is a cross-section through a screen-printing arrangement according to the invention.

In FIG. 1, the screen 1 moves in the direction of the arrow 2, whilst the sheet 3 of material moves in the direction of the arrow 4. The sheet 3 of material is supported underneath by the printing surface 5. Above the screen 1 there is a dye hopper 6 containing dye 13 in granular or powder form. According to the invention, the dye is applied to the sheet 3 of material in this granular or powder form, the pure dye being admixed with a granular or powder-form diluent, for example sand, chalk or finely ground calcium carbonate powder. The object of this is merely to ensure that the basically highly intensive dye is applied to the sheet of material in the correct concentration. It is best for the pile of the sheet of material 3 to be held open as widely as possible, rather than squeezed during application of the dye powder. Naturally, this can only be achieved by preventing the screen 1 from penetrating into and compressing the sheet 3 of material. Below the printing table 5 there is a vibrating table 7, preferable in the form of an electromagnet 8 fed with alternating current. A spring 9 presses the vibrating table 7 upwards when the feed voltage or feed current just shows a zero-axis crossing. Accordingly, the vibrating table is pulled upwards when the feed current passes through a maximum or minimum. Accordingly, the printing table 5 is vibrated in the direction of the arrow 10. This vibration helps the powder-form or granular dye to penetrate at those points 11 at which the screen 1 is perforated. A distributor bar 12, which extends through the dye hopper 6 over its entire length, provides for uniform distribution of the dye powder 13 in the hopper 6. To insure that the movement of the screen 1 does not entain the dye powder along the inner wall of the screen stripper edges 14 are provided along the hopper 6.

Figure 2:
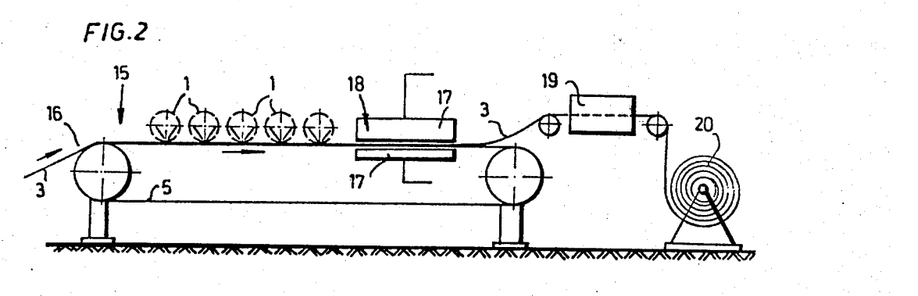
FIGS. 2 and 3 are side elevations of printing installations operating by the method according to the invention.

FIG. 2 shows a rotary screen printing machine 15 in which the printing screens 1 are provided with a knife-coating arrangement of the kind used in the embodiment described with reference to FIG. 1. The sheet 3 of material is applied at 16 to the printing surface 5, comprising a flexible belt, of the printing machine 15, and is printed with powder-form dyes through the screen 1 in the manner described. The dye can be made to flow particularly freely by suitably selecting the quantity of diluents added (sand, quartz sand, chalk or ground calcium carbonate).

After all the dyes have been applied to the sheet of material, the sheet of material 3, is passed through a heating zone 18 which is advantageously situated in the printing machine itself. The heating zone can be in the form of a short-wave heating system. In this way, the quantity of dye powder held by the pile cannot be disturbed in its distribution by vibration or by hot air blown onto it, so that the geometric pattern remains intact. In addition, the short-wave heating system is able quickly and effectively to heat the sheet of material 3, including the dye powder held in it when it is situated between the two electrode plates 17. Since, according to the invention, the dye powders are so-called non-sublimation-fast dyes, or, more accurately, sublimable dyes, these dyes are attached to the constituent fibres of the sheet of material 3 through sublimation in the heating zone 18. After leaving the heating zone 18, the sheet of material 3 is lifted off the machine and delivered to a beating and dust-removing unit 19 in which the granular or powder-form diluents (sand, chalk or powdered calcium carbonate) are removed from the sheet of material. This is best done by simultaneous beating and suction. Thereafter the sheet of material thus printed and completed is wound into a roll 20.

Figure 3:
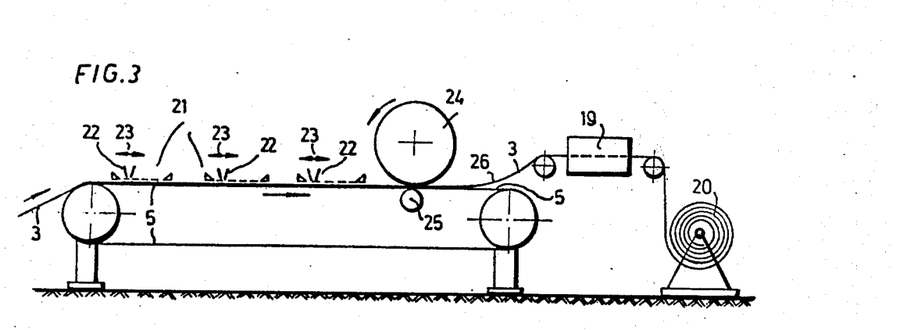

FIG. 3 illustrates the application of the invention to a litho printing machine. The sheet of material 3 is delivered to the sections 21 of a litho printing machine. Knife-coating units 22, which substantially correspond to the knife coating unit shown in FIG. 1, apply the dye powder described above to the sheet of material 3. In this case, the knife coaters 22 are not fixedly mounted, as in FIG. 1, but are displaceable in the direction of the arrows 23. The major advantage of using litho printing acreens for printing sheets of material with powder-form or granular dyes is that the pile of the material is compressed far less heavily than it is when rotary screens are used. Substantially the entire surface of the litho printing screen rests on the surface of the sheet of material, with the result that the material is in no danger of being compressed or deformed in any way. In this case, too, the flow and penetration of the dye powder into the sheet of material can be facilitated to a considerable extent by vibration underneath the printing surface 5, comprising a flexible belt, or underneath each knife coater 22. In this case, the vibration generator moves along with the knife coater 22 in the direction of the arrow 23. The printing sections 21 are followed by a heating drum 24 with a circumference corresponding to the repeat factor or to several times the repeat factor. In addition, the heating drum 24 squeezes the sheet of material togehter into a close "man-to-man position" of the pile fibres. The dye powder is held between the pile fibres together with the diluent (sand, chalk or ground calcium carbonate). The fact that the pile is simultaneously squeezed by the drum 24 during heating provides for extremely rapid sublimation of the sublimable dye, in addition to which an extremely sharp pattern is obtained. This is attributable to the fact that the dye is, in effect, trapped between pile fibres pressed tightly against one another. Below the printing surface 5 there is a counter-pressure roller 25 which is not heated because it is only in contact with the printing table. After passing the drum 24 and roller 25, the sheet of material 3 is again lifted off the printing table 5 at 26 and delivered to a beating and dust-removing unit 19 which works in virtually the same way as that illustrated in FIG. 2. The sheet of material 3 is then wound into a roll 20.

In another embodiment of the invention, the dye powder can be applied and introduced into the sheet 3 of material and simultaneously heated in the short-wave heating zone 18 (FIG. 2) under the effect of a single electrostatic field. An electrostatic field of this kind aligns the pile fibres or orients them in the direction of the field lines. In this way, the dye powder is able to penetrate to the bottom of the pile fabric much more easily than in the case of a non-oriented pile.

Figure 4:
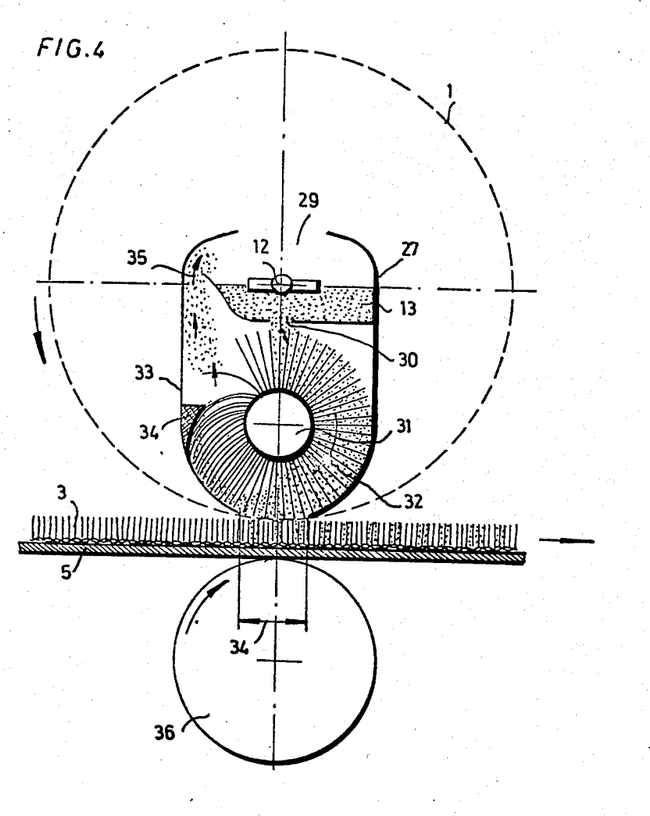
FIGS. 4 and 5 are a cross-sectional and longitudinal section, respectively, through a knife-coating arrangement according to the invention.
Figure 5:
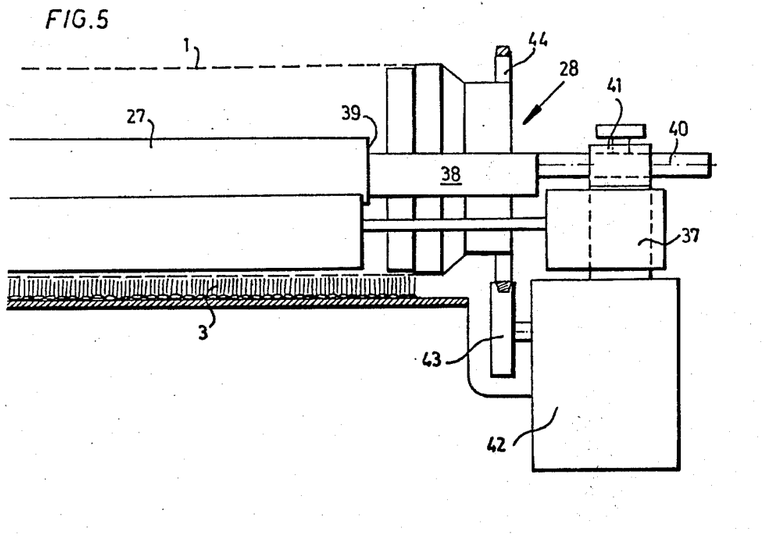

FIGS. 4 and 5 show a special arrangement for applying the dye powder. This arrangement, denoted by the reference 27, is accommodated inside arotary screen 1. The dye powder 13 is introduced into an upper hopper 29 from one of the two ends 28 of the stencil 1. A horizontally oscillating distributor bar 12 provides for uniform distribution of the dye powder 13 in the hopper 29. The dye can flow out of the hopper through a slot 30 into a brush roller 31 which carries it downwards in the direction of the arrow 32. The brush roller 31 is surrounded by the doctor housing 33. In its lowermost part, this doctor housing has a slot-like opening 34 where the brush roller sweeps over the inner wall of the screen 1 and, at the same time, sweeps the dye powder through the openings in the screen 1. Since the screen 1 has areas with perforations and other areas with no perforations according to the pattern, there will be zones in which the powder is unable to leave the screen. In time there would be a heavy accumulation of dye powder in those zones. The adjoining peripheries of perforated pattern zones would then receive more dye powder in the vicinity of impermeable i.e. non-perforated, parts of the screen than other zones, resulting in deeper, more intense dyeing. For this reason, a nose 34 inside the doctor housing 33 ensures that the fibres of the brush roller hurry upwards, and the excess of dye powder is returned through an opening 35 to the upper hopper 29 inside the doctor housing 33. A supporting roller 36 below the printing surface 5 supports the printing surface and the sheet of material below the printing screen 1. The brushing roller 31 is driven by a variable-speed drive motor 37. The distributor bar 12 inside the doctor housing 33 receives its oscillating movement from for example, a pneumatic oscillator 38 arranged at the end 39 of the coater. The coater is held in position on the laterally arranged frame 42 of the printing machine by shoulders 40 and bearings 41. The repeat drive wheels 43 and 44 ensure that the printing screen 1 moves synchronously with the sheet 3 of material to be printed.

Figure 6:
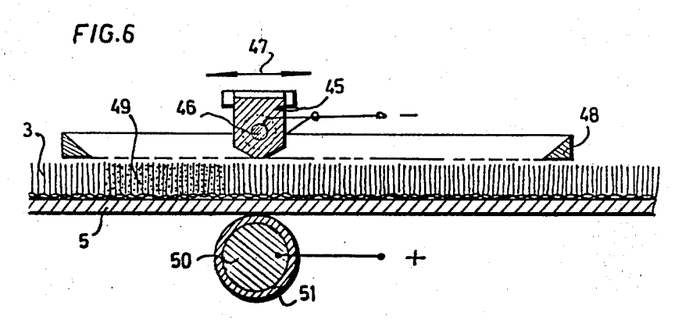
FIG. 6 shows the screen printing section of a litho printing machine.

FIG. 6 shows the printing section of a litho printing machine. In this case, the coating arrangement consists of an orthodox hopper 45, similar to that shown in FIG. 1, inside which is provided a vibration bar 46. By vibration of this bar, the level of powder inside the hopper 45 is kept uniform over its entire surface and, at the same time, penetration of the powder into the sheet of material is facilitated. The hopper is guided over the litho screen 48 in the direction of the arrow 47, dye powder penetrating into the sheet of material 3 through the openings 49 in the screen 48. Below the hopper 45 there is a roller 50 which travels in synchronisation with the hopper 45 in the direction of arrow 47, and supports the sheet of material at the particular point of application. Under this supporting effect, the sheet of material is bent slightly upwards by the supporting roller 50 together with the printing surface 5. In other words those parts of the sheet of material situated to the left and right of the supporting roller are pulled downwards and, as a result, that part of the sheet of material situated immediately above the supporting roller is bent upwards. In this way, the pile of the sheet of material is opened to a considerable extent and the free-flowing dye is able to penetrate into the pile particularly easily from the hopper 45. In addition, opening of the pile can be further facilitated to a considerable extent by connecting the roller 50 for example to the positive terminal of a high-voltage source, for example of 20 to 60 KV. In this case, the journals of this roller must of course be insulated. The roller 50 also has to be protected against accidental contact by an insulating layer 51. The vibration bar 46 and, optionally, the outer part of the hopper 45 as well are connected to the negative terminal of this high-voltage source. This negative terminal is identical with earth, in other words it is substantially free from voltage. In this way, a strong electrical field is established between the hopper 45 and the supporting roller 50. Accordingly, the individual pile fibres are orientated along the field lines and the free-flowing dye is able to penetrate readily into the pile of the sheet of material, for example in the form of carpeting.

Figure 7:
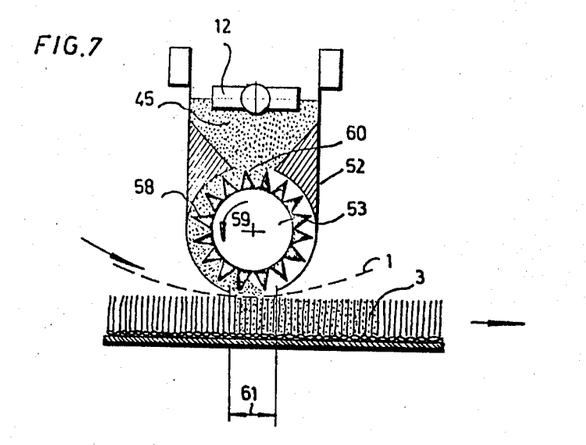
FIGS. 7 and 8 are a longitudinal section and cross-section, respectively, through another knife-coating arrangement according to the invention, including the associated printing screen.
Figure 8:
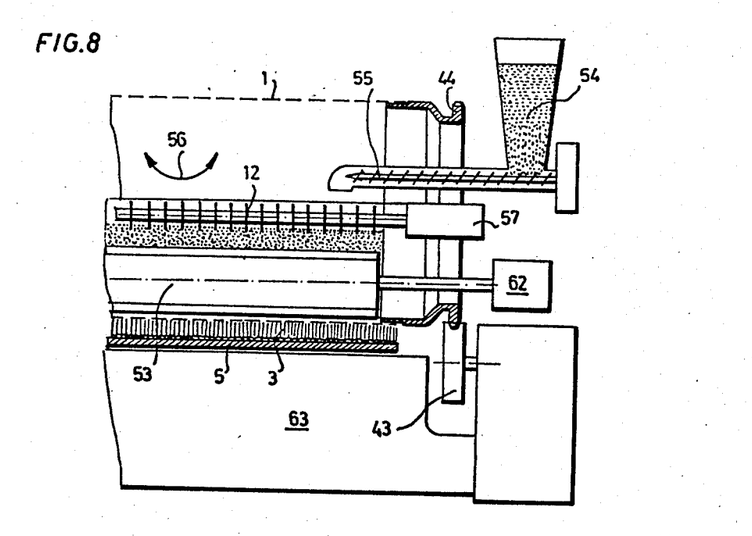

FIGS. 7 and 8 show another embodiment of the coating arrangement according to the invention for applying dye powder. A doctor housing 52 surrounds a roller 53 with a profiled, toothed rubber surface. Instead of this roller, it would also be possible to provide a brush roller with relatively short, stiff bristles. The dye powder is accomodated in a hopper 45 above this roller, being kept at a uniform level by means of an oscillating distributor bar 12. The dye is topped up through a feed hopper 54 outside the screen 1 and a small feed screw 55. The distributor bar 12 receives its oscillating movement (56) from an oscillator 57 mounted on the bar. It can be seen that this movement 56 does not take place in one plane only, instead a vertical movement is superimposed on it. Accordingly, the oscillating movement 56 as a whole corresponds to an arcuate motion. The roller 53 provided with the rubber tooth profile 58 rotates in the direction of the arrow 59. At 60 dye powder penetrates into the tooth profile 58 of the roller 53 and, under the effect of the rotary movement 59, is delivered by that roller to the slot 61 where it penetrates into the sheet 3 of fabric, optionally under the effect of vibrators or electrostatic fields, as already described.

Naturally the dye is only able to penetrate at those places where the screen is perforated. However, at those places where the screen is impermeable, the dye is unable to drop out of the tooth profile 58, and is carried back to the zone 60 where only those parts of the tooth profile which have been emptied in the vicinity of the slot 61 at the lower end of the coating unit 52 are filled with fresh dye powder from the feed hopper 45. This arrangement provides for the continuous topping-up of dye, with the result that dye distribution and, hence, the depth of colour obtained by the sublimation process are not affected by the particular engraving of the screen. The roller 53 is driven through a drive motor 62. The sheet of material 3 is supported underneath by the printing surface 5 which is in turn supported by the printing table 63. The screen is driven in synchronisation with the printing surface 5 by repeat wheels 43 and 44.

Figure 9:
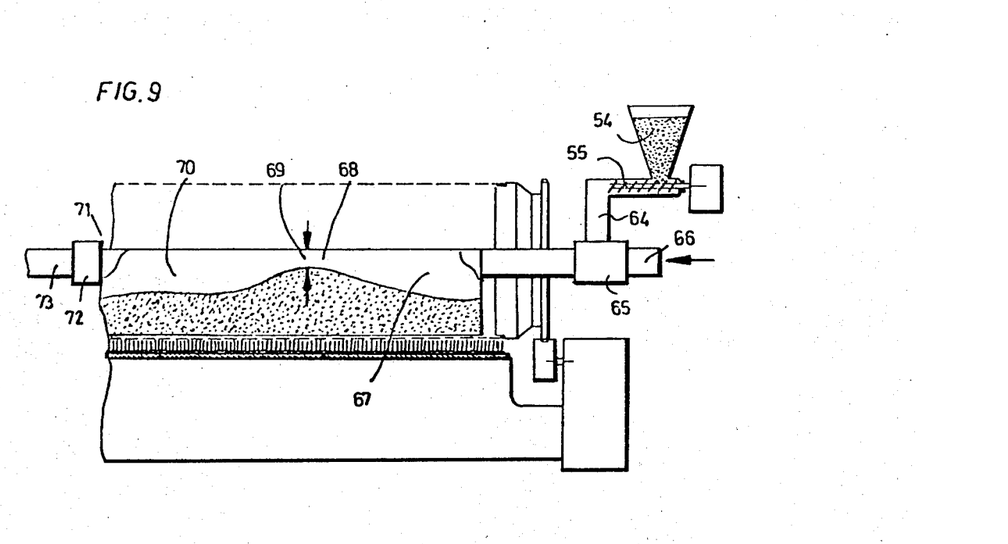
FIG. 9 is a side elevation of another printing arrangement.

FIG. 9 shows another possible arrangement for facilitating the penetration of dye powder into a carpet. In this case, too, the dye powder is introduced from a feed hopper 54 by way of a feeder screw 55. At the end of the feeder screw 55, the dye drops through a pipe section 64 into a mixing valve 65. Air under slight excess pressure enters the mixing valve at 66 and uniformly distributes the dye over the entire length of the coating arrangement 67 in which the flow cross-section is widened. As a result, the rate of air flow drops and the particles of dye drop downwards through the gently moving air and are collected in a hopper-like container. This hopper-like container can be similar to the dye hopper shown in FIG. 1. This hopper may also contain a distributor bar 12 in order to keep the level of dye more constant. Basically, however, the air stream is sufficient to remove particles of dye from those places where the dye powder would otherwise accumulate. At these places 68, the accumulation of dye heavily constricts the cross-section 69 available to the air stream, with the result that the flow of air is greatly accelerated to a level at which it is able to carry dye particles along with it. As a result, dye particles are either no longer deposited or are picked up by the accumulation and carried onwards. At the places 70, at which there is a deficiency of dye particles, the flow cross-section for the air is great and the rate of air flow falls to such an extent that the air is unable to carry dye particles along with it. Accordingly, the dye particles drop out of the air stream. At the left-hand end 71 of the coating unit, there is a filter 72 and the filtered, clean air can flow off into the open through a pipe section 73 which simultaneously serves as an anchorage or retaining element for the coater at this end.

Figure 10:
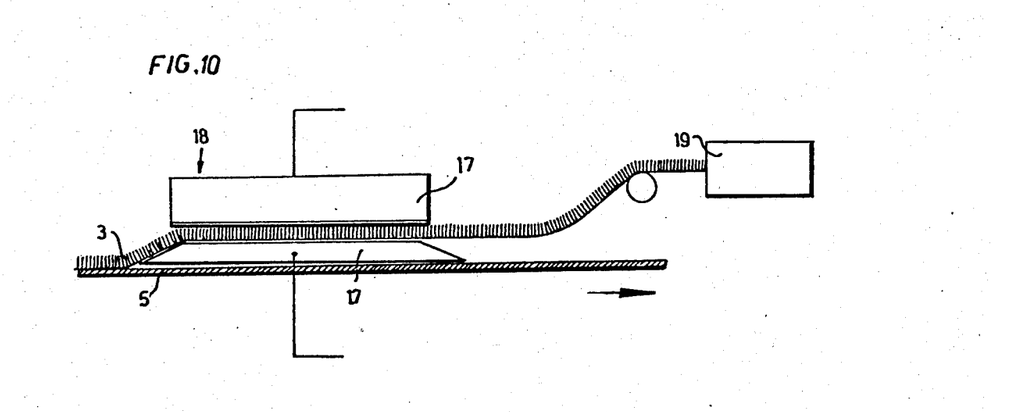
FIG. 10 shows one particular embodiment of the heating system.

FIG. 10 shows the heating zone in the form of a short-wave heating system. In order, during heating of the material to be printed, to prevent the printing surface 5 from being heated as well, the material 3 is lifted off the printing surface and passed between two electrode plates 17 between which the short-wave field is maintained. Under the effect of this type of heating, the dye is sublimed and the sublimable dye is fixed to the fibres. After passing through the heating zone 18, the sheet of material is delivered to a dust-removing unit 19, as already described.

The invention is by no means confined to the embodiments illustrated. The various modifications of the method according to the invention described above may be used in any combination with one another. In addition, the method according to the invention is suitable not only for printing heavy-pile carpeting, but can also be used with substantially the same advantages for printing lighter textile materials. In all these cases, the method according to the invention saves considerable energy costs when it comes to predrying the dye pastes and subsequently steaming, washing and drying the sheets of material. In addition, it is possible by applying the method according to the invention to save a considerable amount of the fresh water required in the production of printed textile materials. The coating units illustrated in combination with litho printing screens can also be used with circular screens, and vice versa. It is also possible to use different printing machines, for example electrostatic printers. The dye particles can also be given an electrostatic charge before or during their passage through the screen. In the case of multicolour printing, or even in cases where a repeat is printed with several screens, the colour can be fixed in a heating zone behind each screen.

The oscillators, vibrators and brushes can also be eliminated. In some cases, it is even sufficient simply to slide the screen in order to introduce the dye.

In the preferred application of the claimed method, namely the printing of synthetic fibres with dispersion dyes, it is sufficient subsequently to apply suction to the printed material in order to remove the fillers used.

In cases where the textile materials are printed with water-soluble dyes, and the dyes are fixed by streaming, the materials usually have to be washed, although washing is made very much easier by the absence of thickeners.

The method according to the invention is distinguished from comparable printing techniques, for example transfer printing, by the fact that it can be carried out simply and economically, and from conventional liquid printing techniques by its compatibility with the environment (no effluent problems), easier storing of the dyes and easier cleaning of the dyeing installation (for example with compressed air).

The prints obtained by the method according to the invention show good all-round fastness, whilst the synthetic fibre-based materials which are preferably printed by the method according to the invention show, for example, outstanding resistance to water.

The method according to the invention illustrated by the following Examples:

EXAMPLE 1

A dye powder, prepared by mixing 15 parts of a dye corresponding to the formula and 85 parts of talcum, is applied by brush coating using a film printing screen with a 60 μ opening to a back-coated needle fleece consisting of polyester and polyamide (70:30), horizontally fixed for 2 minutes at 170° C in a hot-air fixing compartment with the blower throttled and subsequently subjected to a vacuum, for example using a vacuum cleaner. A clearly defined yellow print is obtained which, without washing, shows good to very good resistance to water.

EXAMPLE 2

A dye powder obtained by mixing 15 parts of a blue dye corresponding to the formula and 85 parts of sodium sulphate, is applied in the same way as described in Example 1.

EXAMPLE 3

A dye powder obtained by mixing 10 parts of the red dye and 90 parts of Maltodextrin, is applied in the same way as described in Example 1.

EXAMPLE 4

A dye powder obtained by mixing 20 parts of a violet dye corresponding to the following formula and 80 parts of a styrene-acrylonitrile resin, is applied in the same way as described in Example 1, except that the dye is fixed for 2 minutes at 185° C using high-temperatuare steam.

EXAMPLE 5

Dye mixtures are prepared in the same way as described in Examples 1 to 4. 4% of a high molecular weight silica (aerosil 300) are additionally added to improve the free-flow properties of the mixtures.

EXAMPLE 6

A dye powder prepared as follows is used in the same way as described in Example 1:
A mixture of
45.0 parts of the dye 5.0 parts of an ethylene oxide adduct of 10 mols of ethylene oxide and 1 mol of nonyl phenol,
4.0 parts of an ethylene oxide adduct of 6 mols of ethylene oxide and 1 mol of nonyl phenol,
10.0 parts of ethylene cellulose,
35.8 parts of a maleate resin with an acid number of 190 to 220, and
0.2 parts of 2,2'-methylene-bis-(4-methyl-6-tert.-butyl-phenol)
is kneaded for 2 to 3 hours at 80° to 100° C. Kneading is carried out by initially preparing a viscous, kneadable mass, heating the kneader and subsequently kneading that mass for 2 to 3 hours at a temperature of 80° to 100° C. In order to be able to maintain this kneading temperature, the kneader may have to be cooled again after heating on account of the heat generated during kneading. The dye preparation obtained is ground after cooling to room temperature.

EXAMPLE 7

A polyamide-based carpeting is printed in the same way as described in Example 1 with a dye powder obtained by mixing 20 parts of a grey 1:2 chromium complex dye corresponding to the formula with 80 parts of talcum. The dye is fixed by steaming for 2 to 5 minutes at 112° to 125° C. In this case, the excess, unfixed dye is washed out by spraying with water (20° to 60° C). Washing is made very much easier by the absence of thickener.

EXAMPLE 8

A dye powder obtained by mixing 20 parts of a red dye corresponding to the formula with 80 parts of talcum, is applied in the same way as described in Example 1 but on this occasion to a wool-based carpeting. The dye is fixed with superheated steam at 100° to 102° C. Excess dye is washed away in the same way as in Example 7.

EXAMPLE 9

A dye powder of 15 parts of the dye used in Example 1 and 85 parts of talcum is prepared by drying a finely divided aqueous dispersion of these two components:
a. in a drying cabinet at 80° to 90° C, followed by grinding, or
b. in spray dryer with a two-component nozzle.
A fine powder is directly obtained in this way.

We claim:
1. A method for printing heavy pile sheet materials with a pattern comprising the steps of
   a. applying a dry, free-flowing composition consisting essentially of non-hygroscopic sublimable disperse dye or mixture of sublimable disperse dye and inorganic filler, in a pattern to a heavy pile material said dye being capable of being heat fixed on said heavy pile sheet material;
   b. heat fixing said dye on said heavy pile sheet material; and
   c. removing the unfixed dye or dye/filler mixture.
2. The method of claim 1 wherein said heavy pile sheet material is printed by the screen-printing technique.
3. The method of claim 1 wherein said heavy pile sheet material is printed by the fiber-printing technique.
4. The method of claim 1 wherein said heavy pile sheet material is a carpet of polyester or polyamide fibers, and the dye preparation is a mixture of sublimable disperse dye and inorganic filler.
5. The method of claim 4 wherein said inorganic filler is talcum, talcum/high molecular weight silica mixtures or calcium carbonate.
6. The method of claim 1 wherein the dye is applied to the heavy pile material electrostatically using electrically chargeable rollers.
7. The method of claim 1 wherein the heavy pile sheet material is curved towards the container from which the dye is introduced to open and align the pile.
8. The method of claim 6 wherein a supporting surface is pressed against the heavy pile sheet material at a point opposite the container from which the dye is introduced.
9. The method of claim 1 wherein the heavy pile sheet material is supported on a movable printing surface during step (a) but is lifted off the printing surface during step (b) in order to avoid heating of the printing surface.

* * * * *